(12) United States Patent
Matsumoto et al.

(10) Patent No.: US 8,312,274 B2
(45) Date of Patent: Nov. 13, 2012

(54) IMAGE PROCESSING APPARATUS AND METHOD FOR CONTROLLING THE SAME

(75) Inventors: Atsushi Matsumoto, Tokyo (JP); Fumitoshi Ito, Kawasaki (JP); Fumio Mikami, Chigasaki (JP); Junya Arakawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 784 days.

(21) Appl. No.: 11/946,608

(22) Filed: Nov. 28, 2007

(65) Prior Publication Data

US 2008/0130884 A1 Jun. 5, 2008

(30) Foreign Application Priority Data

Dec. 5, 2006 (JP) .................................. 2006-328845

(51) Int. Cl.
*H04L 9/32* (2006.01)
*H04L 29/06* (2006.01)
*G06K 15/00* (2006.01)
*G06F 3/12* (2006.01)

(52) U.S. Cl. ....... 713/170; 713/150; 713/168; 358/1.14; 358/1.15

(58) Field of Classification Search .......... 713/150–153, 713/164–170, 182–183; 726/2–10, 26–30; 358/1.1, 1.14, 1.15; 709/223, 225, 227, 229
See application file for complete search history.

(56) References Cited

U.S. PATENT DOCUMENTS

| 5,486,828 | A | 1/1996 | Mikami | 341/59 |
| 5,771,101 | A | 6/1998 | Bramall | 358/405 |
| 7,640,318 | B1* | 12/2009 | Hull et al. | 709/217 |
| 7,917,638 | B1* | 3/2011 | Appelman et al. | 709/229 |
| 2001/0038462 | A1* | 11/2001 | Teeuwen et al. | 358/1.15 |
| 2002/0062453 | A1* | 5/2002 | Koga | 713/202 |
| 2005/0027804 | A1* | 2/2005 | Cahill et al. | 709/206 |
| 2005/0100378 | A1* | 5/2005 | Kimura et al. | 400/76 |
| 2005/0141020 | A1* | 6/2005 | Harano | 358/1.15 |
| 2005/0193200 | A1* | 9/2005 | Akiba et al. | 713/168 |
| 2005/0254070 | A1* | 11/2005 | Sayama | 358/1.1 |

(Continued)

FOREIGN PATENT DOCUMENTS

CN 1766762 A 5/2006

(Continued)

OTHER PUBLICATIONS

Chinese Office Action dated Mar. 30, 2012 issued in corresponding Chinese Patent Application No. 200710196493.0.

*Primary Examiner* — Darren B Schwartz
(74) *Attorney, Agent, or Firm* — Fitzpatrick, Cella, Harper & Scinto

(57) ABSTRACT

The present invention improves security of image data when communication between an image managing apparatus that stores the image data of a submitted job and an image processing apparatus is not possible. To accomplish this, for executing a specific process according to a submitted job, the image data and log information of the job is transmitted to the image managing apparatus to store them when the image processing apparatus can communicate with the image managing apparatus. After transmission of the image data and the log information, upon receiving a notification indicating the completion of storage from the image managing apparatus, control is made to execute a specific process on the image data.

3 Claims, 13 Drawing Sheets

U.S. PATENT DOCUMENTS

| | | | | |
|---|---|---|---|---|
| 2005/0254086 A1* | 11/2005 | Shouno | ........................ | 358/1.15 |
| 2006/0028530 A1* | 2/2006 | Nishiyama | .................... | 347/153 |
| 2007/0038857 A1* | 2/2007 | Gosnell | ........................ | 713/165 |
| 2008/0028438 A1* | 1/2008 | Sakakibara | ....................... | 726/2 |
| 2011/0249283 A1 | 10/2011 | Okada et al. | | |

FOREIGN PATENT DOCUMENTS

| | | |
|---|---|---|
| JP | 10-503901 | 4/1998 |
| JP | 2002-057895 | 2/2002 |
| JP | 2004-208048 | 7/2004 |
| JP | 2006-197230 A | 7/2006 |

* cited by examiner

FIG. 4

| | |
|---|---|
| TYPE OF JOB | COPY OUTPUT |
| DEVICE ID | 123456789 |
| JOB START TIME | 2005/12/25/ 9:15 |
| JOB REQUESTER | Suzuki Ichitarou |
| DOCUMENT ID | 5554443322 |

| | EXAMPLE 1 | EXAMPLE 2 |
|---|---|---|
| 4001 TYPE OF JOB | FAX TRANSMISSION | E-MAIL TRANSMISSION |
| 4002 DEVICE ID | 123456789 | 123456789 |
| 4003 JOB START TIME | 2005/12/26/ 9:15 | 2005/12/26/ 9:15 |
| 4004 JOB REQUESTER | Suzuki Hanako | Suzuki Hanako |
| 4005 DOCUMENT ID | 5554443324 | 5554443326 |
| 5006 ADDRESS | 030-123-xxxx | suzuki@xxx.vvv |

IMAGE PROCESSING APPARATUS AND METHOD FOR CONTROLLING THE SAME

BACKGROUND OF THE INVENTION

1. Field of the Invention

The present invention relates to an image processing apparatus and a method for controlling the same.

2. Description of the Related Art

With the widespread availability of image forming apparatuses such as multifunction peripherals having multiple functions in recent years, anybody can now easily copy or transmit documents. This has brought improved convenience to users, but also has increased the risk of information leakage that occurs when copying or transmitting confidential documents.

For the purpose of preventing and monitoring such information leakage, an image forming apparatus has been proposed in which image data and log information of various jobs such as copy jobs or print jobs are produced and then stored in a storage device (Japanese Patent Laid-Open No. 10-503901).

This technology makes it possible to track which user has printed or transmitted a leaked document.

Meanwhile, a network document management system has been proposed in which a server that stores image data and document data in association with document identification information such as keywords is connected via a network to clients who request processes including information retrieval from the server, displaying, and printing. As used herein, image data and document data include those produced by reading printed letters, figures, and images with a scanner and those produced with a word processor or the like.

Also, an image forming system has been proposed in which information stored in the apparatus of Japanese Patent Laid-Open No. 10-503901 is transmitted and registered using this network document management system as an archive server, so that clients can retrieve and browse the information.

However, when storing image data in an archive server on a network, the image forming apparatus needs to be capable of communication with the archive server through the network. For example, if an output is copied or printed according to the instruction of a copy or print job of the image forming apparatus in a state in which communication is not possible due to a network failure or the archive server being down, the image data and log information for tracking are not stored. This creates security problems.

It is also possible to employ a configuration in which image data and log information to be transmitted to the archive server are stored temporarily in a storage unit included in the image forming apparatus, the image data is printed, and the stored image data and log information are transmitted when communication is re-established. This configuration provides an advantage that an operator can immediately receive the product of a job he/she already submitted, that is, a printed paper output if the job is, for example, a copy job or print job. However, there is a risk that the product may be leaked during the time period until the server recovers, creating a security loophole.

Further, even when a network failure has been repaired or the archive server has recovered, and communication has been re-established, archive server breakdown of the image forming apparatus or a malicious attack such as, for example, causing physical damage can lead to the image data and log information remaining untransmitted to the archive server, which in turn leads to a security problem.

When communication between the image forming apparatus and the archive server is not possible, the security problem can be eliminated by controlling the image forming apparatus not to accept a copy or print job, even when the apparatus is operating normally. However, despite the fact that the image forming apparatus is operating normally, the operator needs to submit the copy job, print job, or the like again, which causes inconvenience to the operator.

The image forming apparatus may be used as follows: the image forming apparatus is connected directly to a personal computer (PC), and paper documents are scanned using a software application that runs on the PC through a scanner driver.

In this case, if the image forming apparatus has a storage device that can store a large amount of image data, like the apparatus of Japanese Patent Laid-Open No. 10-503901, no problem arises. However, some low-price scanners and multifunction peripherals do not have a hard disk, or even if they have a hard disk, the capacity thereof is small, so they have a problem that they are not suitable for storing image data.

When the archive server is located on a network and image data is stored in the server, no problem arises if the image forming apparatus is connected directly to the archive server through the network, but when the image forming apparatus is not connected to the network, the following problems occur.

When the image forming apparatus is not connected directly to the network on which the archive server is located, in the case of the above-described example, the image forming apparatus needs to transmit images to the archive server via the PC connected to the image forming apparatus. However, with the use of another apparatus or software, information leakage may be caused by malicious users.

For example, such malicious users can alter images to be transmitted using software in the PC, or can make the image forming apparatus appear to have sent images to the archive server by imitating the response from the archive server, when in fact the image forming apparatus has not sent the images.

SUMMARY OF THE INVENTION

The present invention allows realization of improved security of image data when communication between an image management apparatus that stores image data of submitted jobs and an image processing apparatus is not established.

According to one aspect of the present invention, the foregoing problem is solved by providing an image processing apparatus communicating with an image managing apparatus which stores image data and log information, the image processing apparatus comprising: a transmission unit which transmits image data and log information relating to a job to the image managing apparatus; and a control unit which performs control so as to execute a process on the image data upon receiving a notification indicating the completion of storage from the image managing apparatus after transmission of the image data and log information.

According to another aspect of the present invention, the foregoing problem is solved by providing a method for controlling an image processing apparatus comprising the steps of: transmitting image data and log information of a submitted job to the image managing apparatus to store the image data and log information when communication with an image managing apparatus is possible; performing control so as to execute a process on the image data upon receiving a notification indicating the completion of storage from the image managing apparatus after transmission of the image data and log information.

According to still another aspect of the present invention, the foregoing problem is solved by providing An image processing apparatus comprising: a first receiving unit which receives an encrypted image from an image input apparatus; a transmission unit which transmits the received image to a server which connected to the image processing apparatus through a network; and a second receiving unit which receives, from the server, a decrypted image which has been obtained by decrypting the encrypted image, after the server archives the encrypted image.

According to yet another aspect of the present invention, the foregoing problem is solved by providing an image processing method comprising steps of: receiving an encrypted image from an image input apparatus; transmitting the received image to a server which connected to the image processing apparatus through a network; and receiving, from the server, a decrypted image which has been obtained by decrypting the encrypted image, after the server archives the encrypted image.

According to still yet another aspect of the present invention, the foregoing problem is solved by providing a computer-readable storage medium storing a computer program which executes steps of: receiving an encrypted image from an image input apparatus; transmitting the received image to a server which connected to the image processing apparatus through a network; and receiving, from the server, a decrypted image which has been obtained by decrypting the encrypted image, after the server archives the encrypted image.

Further features of the present invention will be apparent from the following description of exemplary embodiments with reference to the attached drawings.

BRIEF DESCRIPTION OF THE DRAWINGS

FIG. 4 is a table showing an example of log information to be transmitted to an archive server 102 in the case of copying.

FIG. 5 is a table showing an example of log information for a scan function and a print function.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Embodiment 1

Figure 1:
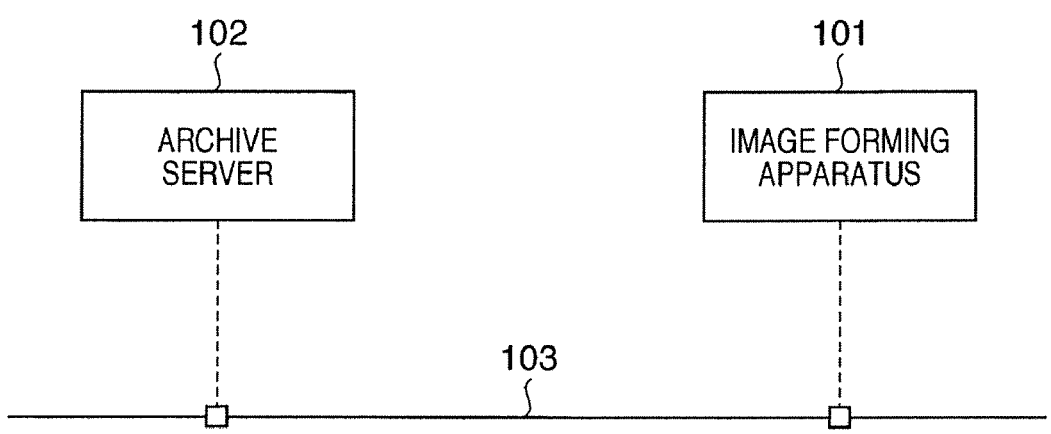
FIG. 1 is a diagram illustrating an example of a system configuration according to Embodiment 1.

FIG. 1 is a diagram illustrating an example of a system configuration according to Embodiment 1. An image forming apparatus 101 shown in FIG. 1 is what is called an MFP (multifunction peripheral) that includes an image input device and an image output device, and has a plurality of functions such as a copy function, a print function, and a scan function. The scan function includes a FAX function, an I-FAX function, a function for transmitting images, and the like, that transmit image files to another network device through a communication line such as a network.

It should be noted that this embodiment is described in the context of an MFP having a plurality of functions, but can be applied to a peripheral having only a single function, such as a copy function, a print function, or a scan function, or to a network image forming apparatus in which a plurality of functions are combined.

In FIG. 1, the image forming apparatus 101 is connected to an archive server 102 through a network 103. The archive server 102 is a storage device used for management and that records and stores all image data input and output by the image forming apparatus 101 together with detailed information of the executed jobs. In other words, the detailed information of the jobs is managed in association with the image data by the archive server 102, which serves as an image managing apparatus.

The image data and the detailed information of the jobs (hereinafter referred to as "log information") stored in the archive server 102 are retrieved and verified when information leakage occurs, allowing identification of from which machine, when, and with which function final products are obtained. The final products can be, for example, paper output such as copies or prints, or scanned image files.

In FIG. 1, only one image forming apparatus 101 is connected to the network 103, but a plurality of image forming apparatuses 101 may be connected to the network 103. Further, by adding information that identifies each device to the log information, the image forming apparatus 101 can function without any problem even in a network system to which a plurality of devices are connected.

Figure 2:
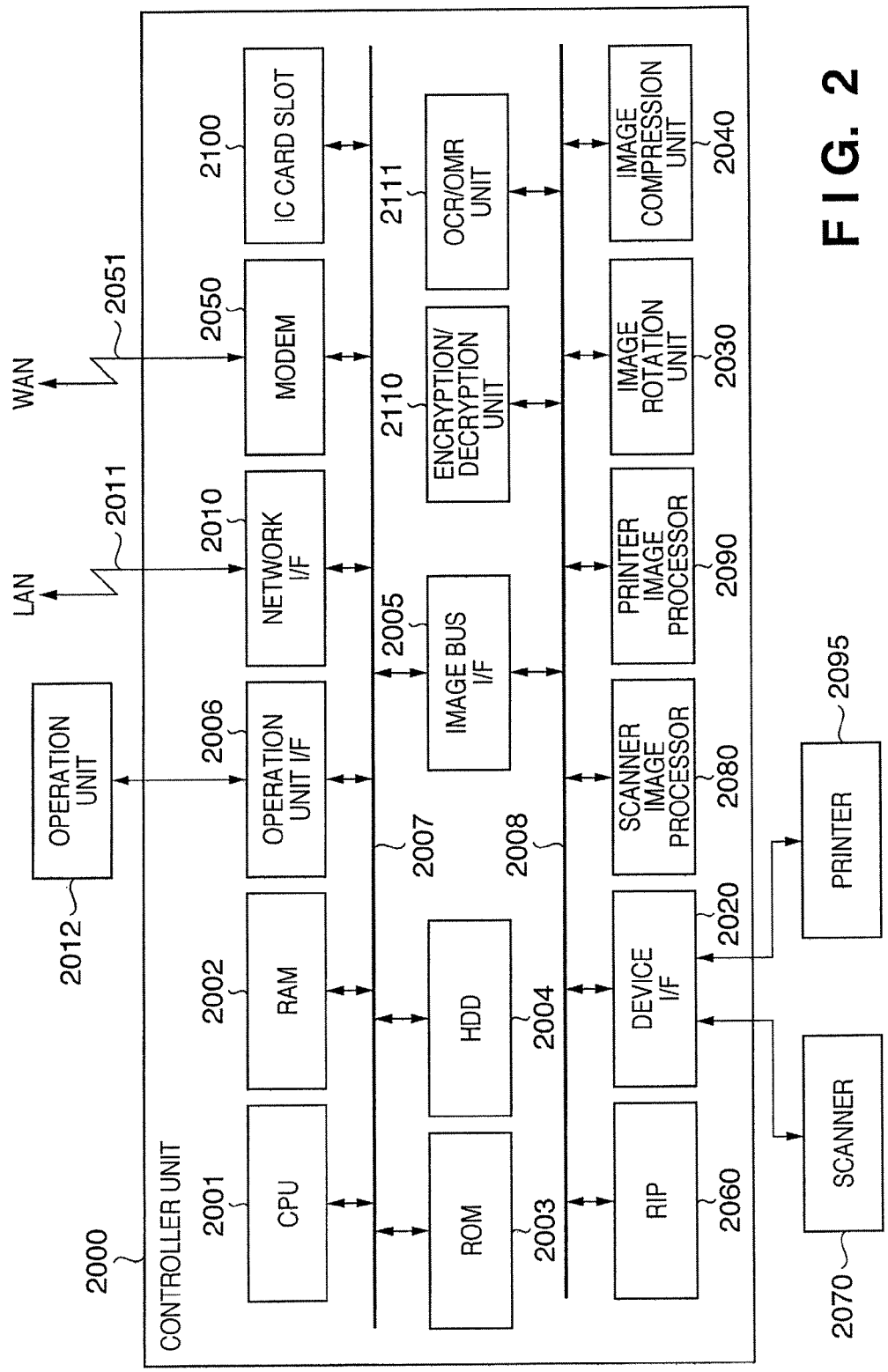
FIG. 2 is a block diagram illustrating a configuration of an image forming apparatus 101 according to an embodiment of the present invention.

FIG. 2 is a block diagram illustrating a configuration of an image forming apparatus 101 according to an embodiment of the present invention. A controller unit 2000 is connected to a scanner 2070 serving as an image input device and a printer 2095 serving as an image output device, and at the same time, is connected to a LAN 2011 or a public line (WAN) 2051, thereby controlling the input and output of image information and device information. A CPU 2001 controls the entire system. A RAM 2002 serves as a system work memory for the CPU 2001 to operate and also as an image memory for temporarily storing image data. A ROM 2003 stores programs and control data to be executed by the CPU 2001, as well as a boot program for starting the system. A HDD 2004 is a hard disk drive that stores system software and image data.

An operation unit I/F 2006 is an interface for an operation unit (UI) 2012 having a touch panel or the like, and outputs image data to be displayed on the operation unit 2012. The operation unit I/F 2006 also serves to transmit information which is input by a user of the system through the operation unit 2012. A network I/F 2010 is connected to the LAN 2011, and performs the input and output of communication information. A modem 2050 is connected to the public line 2051, and performs the input and output of communication information. The devices described above are arranged on a system bus 2007.

An image bus I/F 2005 is a bus bridge for connecting the system bus 2007 and an image bus 2008 that transfers image data at a high speed, and converts data structures. The image bus 2008 uses a PCI bus or IEEE 1394. The following devices are arranged on the image bus 2008.

A raster image processor (RIP) 2060 develops PDL codes into a bitmap image. A device I/F 2020 connects the controller unit 2000 with the scanner 2070 and the printer 2095, and converts image data between a synchronous system and a non-synchronous system. A scanner image processor 2080 performs correction, processing, editing on input image data. A printer image processor 2090 performs print correction, resolution conversion, or the like on image data to be printed out. An image rotation unit 2030 performs rotation of image data. An image compression unit 2040 performs compression and decompression of multi-valued image data in the JPEG format, or binary image data in JBIG, MMR, and MH formats.

An IC card slot 2100 performs user authentication using an IC card medium. This user authentication identifies the user executing the job. The input and output of a key used for encryption and decryption can be performed by inputting an appropriate PIN (Personal Identifier Number) code after insertion of the IC card medium. An encryption/decryption unit 2110 is a hardware accelerator board that performs encryption and decryption of data using a key of the IC card slot 2100 or a key unique to the device. An OCR/OMR unit 2111 deciphers character information or two-dimensional barcodes included in image data and converts them into character codes.

Figure 3:
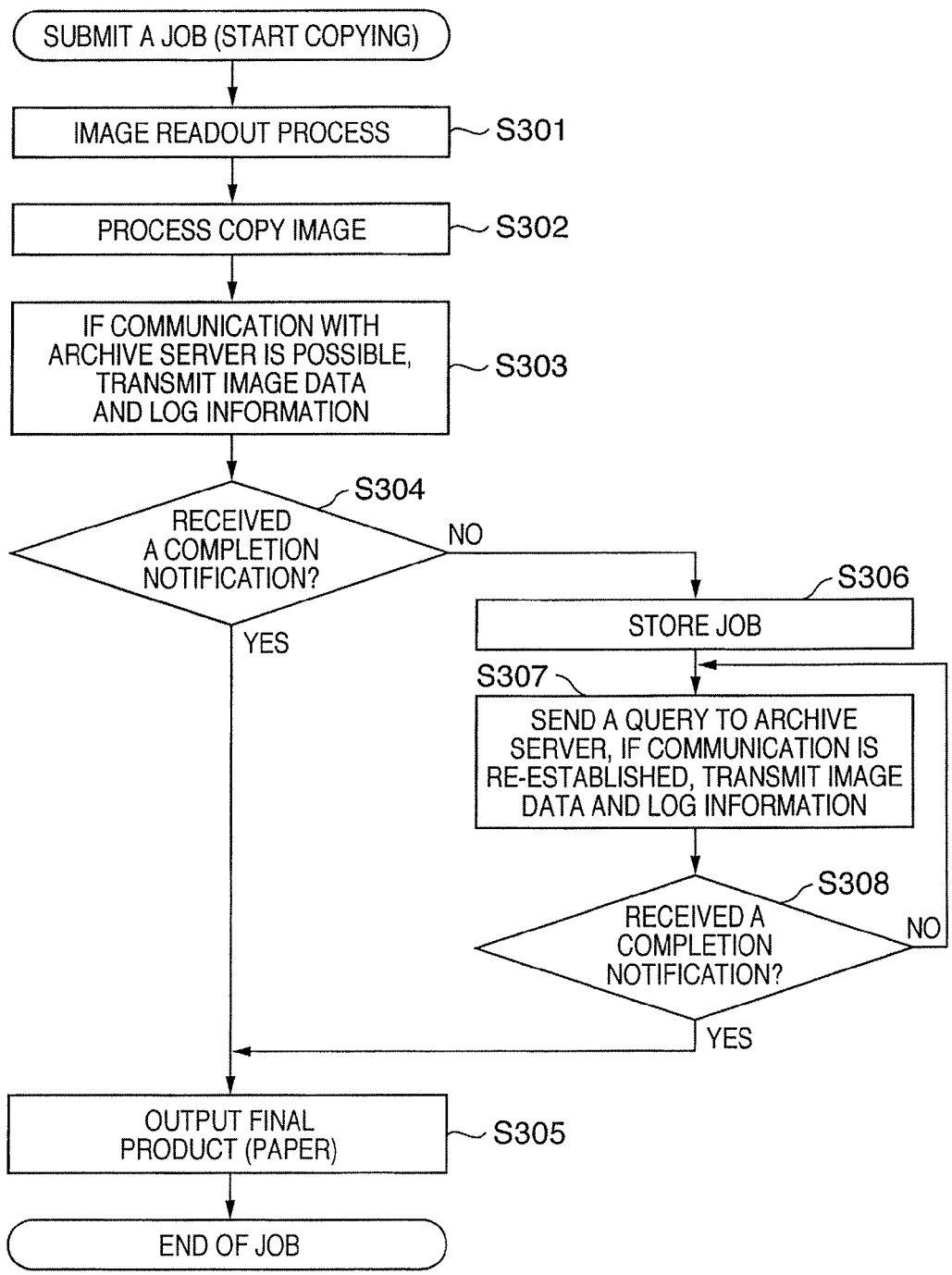
FIG. 3 is a flowchart illustrating a process from submission of a job to the end of the job according to Embodiment 1.

Referring now to FIGS. 3 to 5, a process spanning from submission of a job (copy job) from the archive server 102 to the image forming apparatus 101 to the end of the job shall be described.

FIG. 3 is a flowchart illustrating the process from submission of a job to the end of the job according to Embodiment 1. First, in step S301, when the image forming apparatus 101 receives a copy job from the archive server 102, the CPU 2001 reads out the original document set in the scanner 2070 via the device I/F 2020. Then, in step S302, the scanner image processor 2080 and the printer image processor 2090 process a copy image and store the image-processed image data in the HDD 2004 or the RAM 2002, which serve as temporary storage devices.

Subsequently, in step S303, the CPU 2001 makes a query to the archive server 102 as to whether or not communication is possible. If communication is possible, the CPU 2001 transmits the image data stored temporarily in the HDD 2004 or the RAM 2002 through a network such as the LAN 2011. At the same time, the log information also is transmitted. This log information is used to identify the job and the operator of the job.

FIG. 4 is a table showing an example of the log information transmitted to the archive server 102. In this example, the log information includes a type of job 4001, a device ID 4002 assigned uniquely to each device, a job start time 4003, "a person who requested the job" 4004, and a document ID 4005.

Because the necessary log information differs depending on the type of job submitted, a configuration may be employed in which log information necessary for all conceivable functions is prepared, and switching is performed to determine whether or not the information is written in accordance with the type of job submitted.

FIG. 5 is a table showing an example of log information for scan function and print function. In the case of a fax or image transmission function, address information 5006 is added. A telephone number is written as the address information 5006 in the case of a fax function, and an e-mail address is written as the address information 5006 in the case of an e-mail image transmission function. When transmitting to a public file server, necessary information such as host name and IP address is written. In the case of a print function, the address information 5006 is not required and thus is not written.

Meanwhile, upon receiving image data and the log information, the archive server 102 stores the image data in association with the log information. When it finishes storing, the archive server 102 then informs the image forming apparatus 101 that the storing has been completed.

Referring back to FIG. 3, in step S304, the CPU 2001 determines whether or not a notification indicating the completion of storage has been sent from the archive server 102. Upon receiving the notification indicating the completion of storage, in step S305, the CPU 2001 performs copy output, provides the final product to the operator, and terminates the process. The important point here is that the final product will not be provided to the operator (job requester) if the recording is not made in the archive server 102. This eliminates untraceable jobs, and provides a system with a higher level of security.

A case may occur in which the archive server 102 does not finish the job recording for some reason, such as a case in which communication between the archive server 102 and the image forming apparatus 101 fails to be established due to a network failure, or a case in which the archive server 102 is down due to a mechanical failure. In such a case, the processing proceeds to NO in step S304. In step S306, the CPU 2001 stores the job. In step S307, a query is sent again to the archive server 102 as to whether or not communication is possible. If communication is possible, the CPU 2001 transmits the image data and the log information, and repeats the above-described transmission process of step S307 until the CPU 2001 receives a notification indicating the completion of storage.

The important point here is that the job is not canceled even if the final product cannot be provided to the operator for security reasons when communication is not established; instead, the job is held in the state before the final product according to the job is output. Because the job is stored, the subsequent process for the job is resumed promptly upon re-establishment of the communication, eliminating the need for the operator to submit the job again.

The saving of the job is not particularly limited as long as the job is saved in the storage unit in a state in which the subsequent process can be resumed promptly so that the need for the operator to submit the job again is eliminated; in addition, the extent to which the processing has been carried out is not a matter of importance. For example, the storage can be performed after the processing by the scanner image processor 2080, or after the processing by the printer image processor 2090. The closer to the final process the storage is performed, the more promptly the final product can be provided to the operator after communication is re-established, so the processing time can be shortened. However, the optimal point for performing the job storage varies according to the capacity of the temporary storage unit, the process flow for image processing, the system configuration, or various factors regarding the software sequence.

Subsequently, in step S305, the final product is produced. In this case, the copy image is output on paper. A print job, a scan job, and a fax job also can be carried out with an essentially similar process flow.

According to Embodiment 1, if a failure occurs in communication with the archive server 102, the state of the job is stored until communication is re-established; through this, improved security and improved convenience for operators can be achieved.

Embodiment 2

Embodiment 2 according to the present invention will now be described in detail with reference to the drawings. In Embodiment 2, a description will be given of a process for executing an authentication operation for identifying the operator prior to submission of a job. A process for obtaining a final product when communication with the archive server is recovered from a non-communicatable state will also be described.

A system and an image forming apparatus according to Embodiment 2 have configurations similar to those of FIGS. 1 and 2 described in Embodiment 1, so descriptions thereof shall be omitted here.

Figure 6:
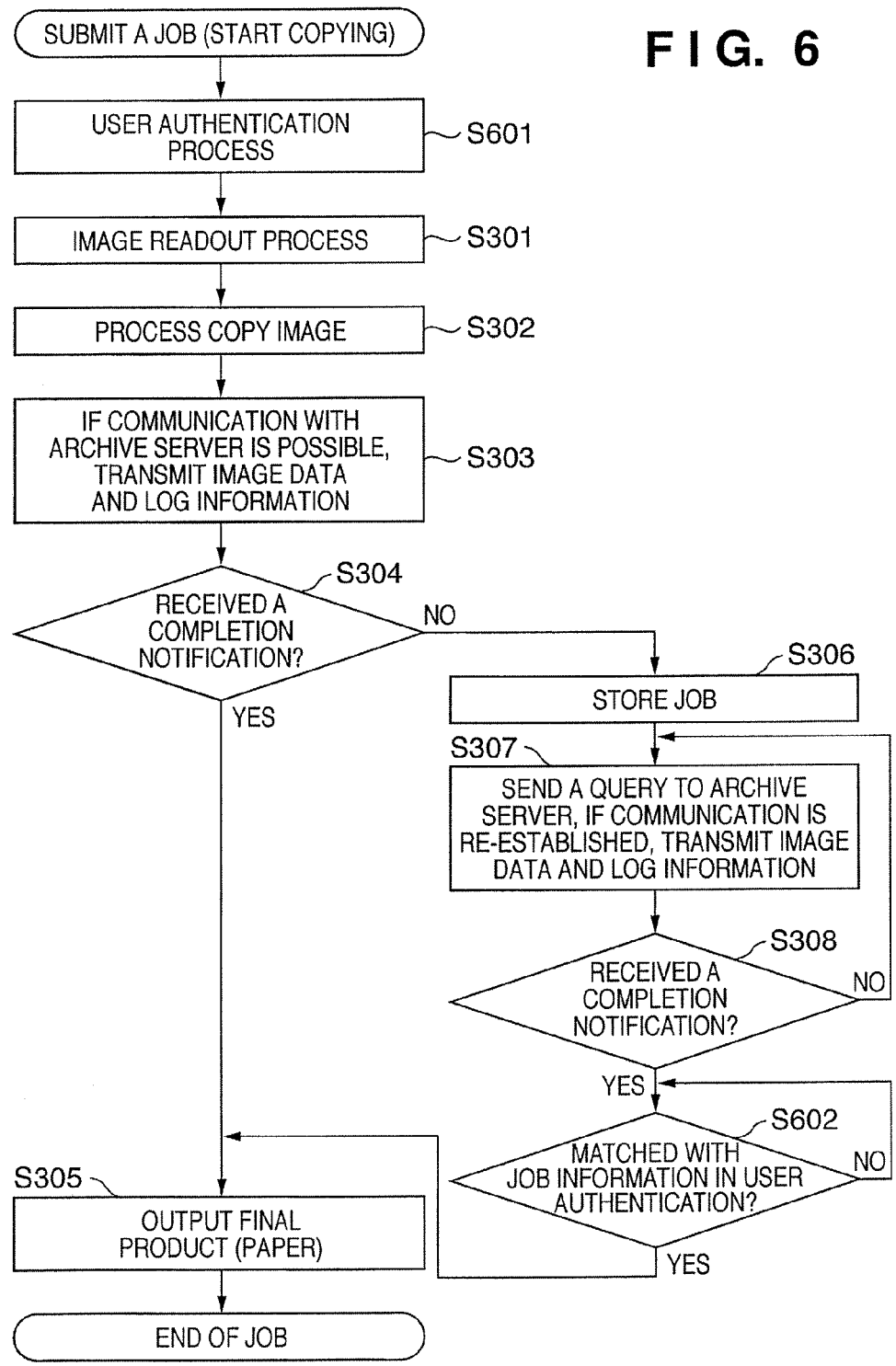
FIG. 6 is a flowchart illustrating a process from submission of a job to the end of the job according to Embodiment 2.
Figure 7:
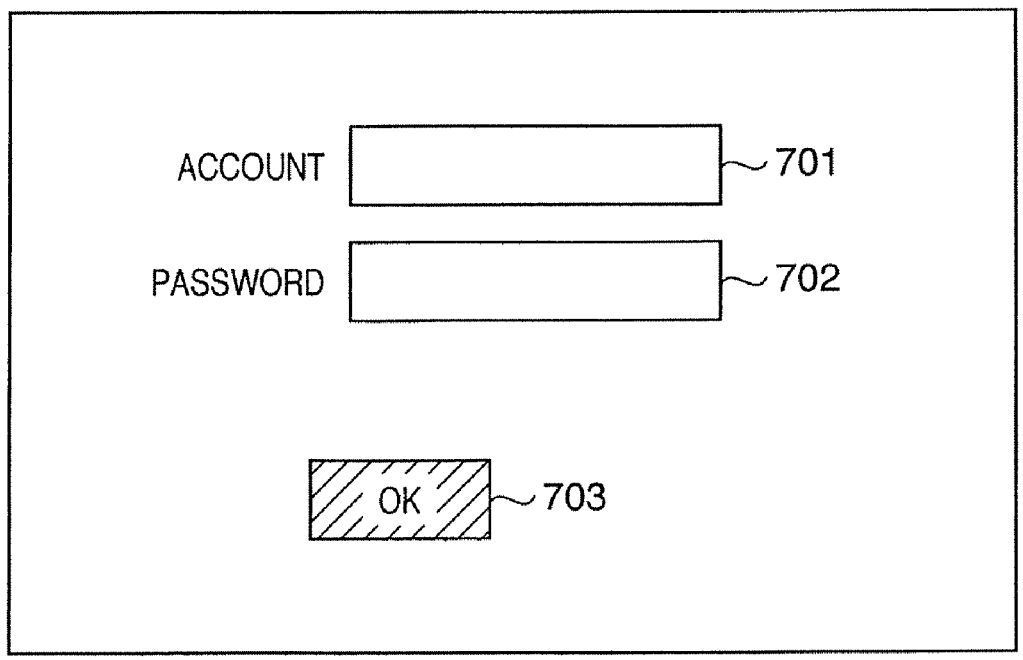
FIG. 7 is a diagram illustrating an example of a display screen of a user authentication UI.

Referring now to FIGS. 6 and 7, a process spanning from submission of a job (copy job) to the image forming apparatus 101 from the archive server 102 to the end of the job shall be described.

FIG. 6 is a flowchart illustrating a process according to Embodiment 2 spanning from submission of a job to the end of the job. First, in step S601, a process for authenticating the operator (user) of the job is performed. In this process, the IC card of the user is read out from the IC card slot 2100, the user information is stored, and the user is identified based on a database (DB) in which information of users has been pre-registered. Then, the information is used as job requester 4004 information in log information.

According to another embodiment, the user authentication may be performed through the operation unit (UI) 2012. FIG. 7 is a diagram illustrating an example of a display screen of a user authentication UI. In FIG. 7, reference numeral 701 designates a user account input area, reference numeral 702 designates a password input area, reference numeral 703 designates an OK key for confirming the authentication, and reference numeral 704 is a cancellation key.

The user inputs the registered account into the user account input area 701, and the registered password corresponding to the account into the password input area 702, and then presses the OK key. With this operation, the CPU 2001 of the image forming apparatus 101 matches the input account and password against the pre-registered user information DB (not shown), and allows the submission of the job if they match.

In contrast, if the input password does not match with the password registered with the account, or if an account that is not registered is input, the CPU 2001 does not allow the submission of the job, and instead displays the authentication screen again. In any case, if the operator (user) who submitted the job can be identified, the user identified by the user authentication is used as job requester 4004 information in log information.

The process thereafter is the same as that from S301 to S308 described in Embodiment 1.

In step S308, upon receiving a notification indicating the completion of storage from the archive server 102, the procedure moves to step S602, where the CPU 2001 performs the user authentication again. For example, in the case of an IC card, an IC card authentication is performed. In the case of authentication using a user account and a password, the authentication is performed by inputting the account and the password. Then, a comparison is made to determine whether or not the job requester is the job requester stored in the log information. If they match, the processing proceeds to step S305 where the final product is allowed to be output. If they do not match, the output is not allowed until the authentication is successful.

When a plurality of jobs requested by the same person have accumulated, the jobs may be processed collectively. It is also possible to obtain a final product by selecting a job from a job selection screen.

According to Embodiment 2, the user authentication of the operator is performed prior to submission of a job, and when communication is re-established after a communication failure, the user authentication is performed again; through this, security can be further improved. Specifically, if it takes some time before receiving a notification indicating the completion of storage from the archive server 102, the operator may be temporarily away from the image forming apparatus. Even in such a case, the final product will not be stolen because the output is not carried out unless the user authentication is performed again.

[Variation]

In Embodiments 1 and 2 described above, the configuration was illustrated in which a job is submitted from the archive server, but a job may be submitted from the PC connected to a network, which is not shown. In this case, this job can be a print job requested through the PC or a storage job for storing image data into the HDD 2004 of the image forming apparatus, and the information of the user who requested and transmitted the job through the PC is added.

As a variation, a scan function of a fax and a function for printing a received image that undergo different procedures according to the type of final product when communication with the archive server 102 is not possible will be described.

First, in the case of the copy function and the print function using PDL described in Embodiments 1 and 2, the final products are output on paper. Accordingly, when communication with the archive server 102 is not possible, in step S306, the job is stored, but will not be output on paper.

Although this does depend on the system configuration, an image read out by the scanner 2070 or an image obtained by bitmapping PDL commands using the RIP 2060 is stored in the temporary storage device such as the HDD 2004 or the RAM 2002 in a state as near to the final product as possible.

In contrast, in the case of a fax, e-mail, or image transmission function to a public file server or the like, the final product is a transmission process itself that transmits image data to an address, or is an image file sent to an address. When communication with the archive server 102 is not established, in step S306, the job is stored without performing the transmission process.

The image forming apparatus 101 image-processes an image read out by the scanner 2070 into an image for transmission, and stores the image in the state near to the final product (in this case, data to be transmitted) in the temporary storage device such as the HDD 2004 or the RAM 2002. Thereafter, in step S308, a process of transmitting to a designated address is executed upon re-establishing the connection with the archive server 102 and confirming the completion of the storage of the image data and the log information.

Next, a storage function for storing an image in the temporary storage device, particularly the HDD 2004, of the image forming apparatus 101, and a function for printing the image will be described.

When an image is transmitted from an external network device and the image is stored using the saving function, the image data is stored in the device of the image forming apparatus 101, and the final product is not provided to the operator (user). Accordingly, a configuration may be employed in which the image data and the log information are not registered in the archive server 102. In this configuration, the sender information is stored in the log information. Also, no matter what state the communication with the archive server 102 is in, no problem arises.

Similarly to the copy job and the print job, the final product of the function of printing the stored image is output on paper. In order to obtain the final product, the user authentication is performed to acquire the job requester information, and select the stored image data and job. Thereafter, when the communication with the archive server 102 is re-established, printing is allowed, providing the paper output to the operator (user).

According to the embodiment and the variation described above, a configuration is employed in which, when communication with the archive server located on a network is not established, the final product such as copy output or print output is not provided; through this, security can be improved.

At the same time, by employing a configuration in which a print job or copy job is accepted, and the final product is provided immediately after communication is re-established, it is possible to provide a system that has no security problems and also minimizes inconvenience for the operator.

Embodiment 3

Next, Embodiment 3 according to the present invention will be described in detail with reference to FIGS. 8, 9 and 10. In Embodiment 3, a case is described in which the image forming apparatus is connected to a personal computer (PC) located on a network, and is connected to the archive server via the PC.

Figure 8:
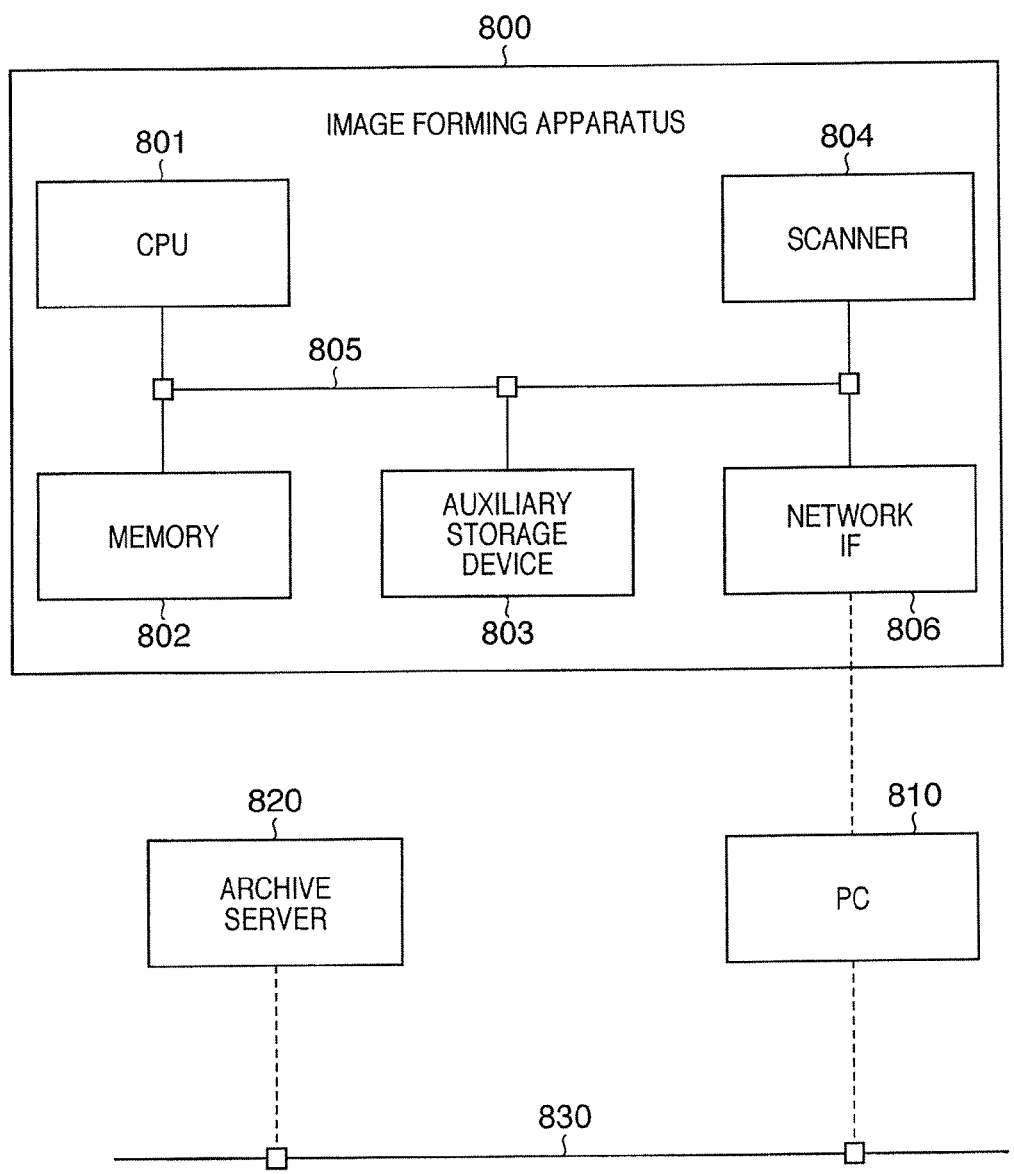
FIG. 8 is a diagram illustrating an example of a system configuration according to Embodiment 3.

FIG. 8 is a diagram illustrating an example of a system configuration according to Embodiment 3. In FIG. 8, reference numeral 800 designates an image forming apparatus of Embodiment 3, reference numeral 810 designates a PC, reference numeral 820 designates an archive server, and reference numeral 830 designates a network.

The image forming apparatus 800 includes a CPU 801, a memory 802, an auxiliary storage device 803, a scanner 804, and a network IF (interface) 806, all of which are connected to an internal bus 805.

The CPU 801 performs execution of the software loaded in the memory 802 and control of devices. The memory 802 is used as an area in which a software program is loaded, and as an area in which data used by software is stored. The auxiliary storage device 803 is made up of a large capacity storage device such as a hard disk drive, and is used to retain the information that cannot be loaded in the memory, store software programs, or the like.

The scanner 804 reads out an image of a group of original documents or a single original document by irradiating light to the image of the original document(s) using a light source and forming a reflected image on a solid-state image sensor using a lens. The solid-state image sensor produces image signals having a predetermined concentration level (e.g., 8 bits) with a predetermined resolution (e.g., 600 dpi), and outputs image data consisting of raster data from the image signals.

The network IF 806 controls the connection with the PC 810, and transmits the control signals input by the PC 810 to the CPU 801. Also, the network IF 806 transmits the data stored in the auxiliary storage device 803 to the PC 810.

The PC 810 is connected to the image forming apparatus 800 through a standard such as USB (Universal Serial Bus), IEEE 1394, or the like, and is also connected to the archive server 820 via a network 830. The PC 810 has a configuration similar to that of commonly-used personal computers, so a detailed description thereof is omitted here.

The archive server 820 is a server for managing images (files) processed in the image forming apparatus 800, and has the function of recording the images together with information regarding when and where the images are formed and who formed the images.

A process characteristic of Embodiment 3, which is performed by the CPU 801 of the image forming apparatus 800, will be described with reference to FIGS. 9 and 10.

Figure 9:
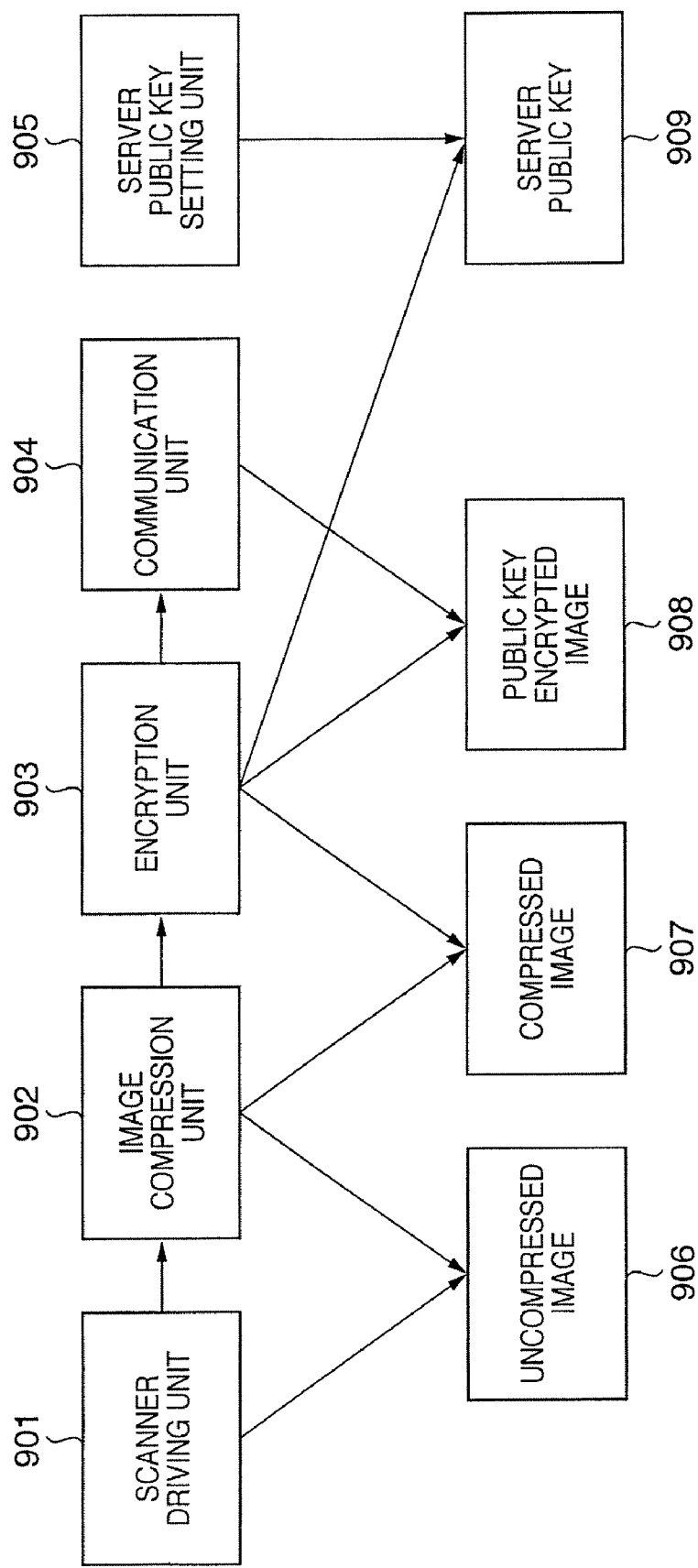
FIG. 9 is a diagram illustrating an example of a configuration of processing units of an image forming apparatus 800 according to Embodiment 3.

FIG. 9 is a diagram illustrating an example of a configuration of processing units of the image forming apparatus 800 of Embodiment 3. A scanner driving unit 901 drives a scanner 804, optically reads out a paper document set in the scanner 804, and stores the resultant as an uncompressed image in the auxiliary storage device 803. An image compression unit 902 compresses the image data into a data amount according to a predetermined compression format, and produces a compressed image.

An encryption unit 903 encrypts the data stored in the memory 802 or the auxiliary storage device 803 using an encryption key. A communication unit 904 transmits the data stored in the memory 802 or the auxiliary storage device 803 to the PC 810 via the network IF 806. A server public key setting unit 905 registers a public key of a public key encryption method issued by the archive server 820 with the scanner.

The uncompressed image 906 is image data read out by the scanner 804. The compressed image 907 is image data compressed by the image compression unit 902. A public key encryption image 908 is image data encrypted by the encryption unit 903. The server public key 909 is a public key for a public key encryption type issued by the archive server 820, which is set by the server public key setting unit 905.

Next, settings for the archive server 820 and the image forming apparatus 800, which should be done by the system administrator before the image forming apparatus 800 performs a scan process, according to an instruction from the PC 810 will be described.

First, the system administrator creates a secret key and a public key of a public key encryption method on the archive server 820, and registers the created public key with the image forming apparatus 800. The administrator then establishes a connection between the archive server 820 and the image forming apparatus 800, and executes the server public key setting unit 905 via the network IF 806. The public key created with the archive server 820 is stored as a server public key 909 in the auxiliary storage device 803 of the image forming apparatus 800. Thereafter, the start-up is password-protected so that ordinary users who use the image forming apparatus 800 cannot change the server public key 909 and that only the administrator can execute the server public key setting unit 905.

The process for registering the server public key 909 with the image forming apparatus 800 is not limited to the above, and it is also possible to record public key data in a removable recording device, connect the removable recoding device to the image forming apparatus 800, and input a public key.

Then, in a system such as that shown in FIG. 9, this setting process ends.

To read out an image, the user places sheets of paper or a single sheet of paper to be scanned on the scanner 804 of the image forming apparatus 800, and sends an instruction to scan to the image forming apparatus 800 using the PC 810 from the application that performs the readout through a scanner driver. The instruction to scan includes readout resolution and information such as a file format.

The image forming apparatus 800, upon receiving the instruction to scan from the PC 810 through the network IF 806, starts a scan process.

Figure 10:
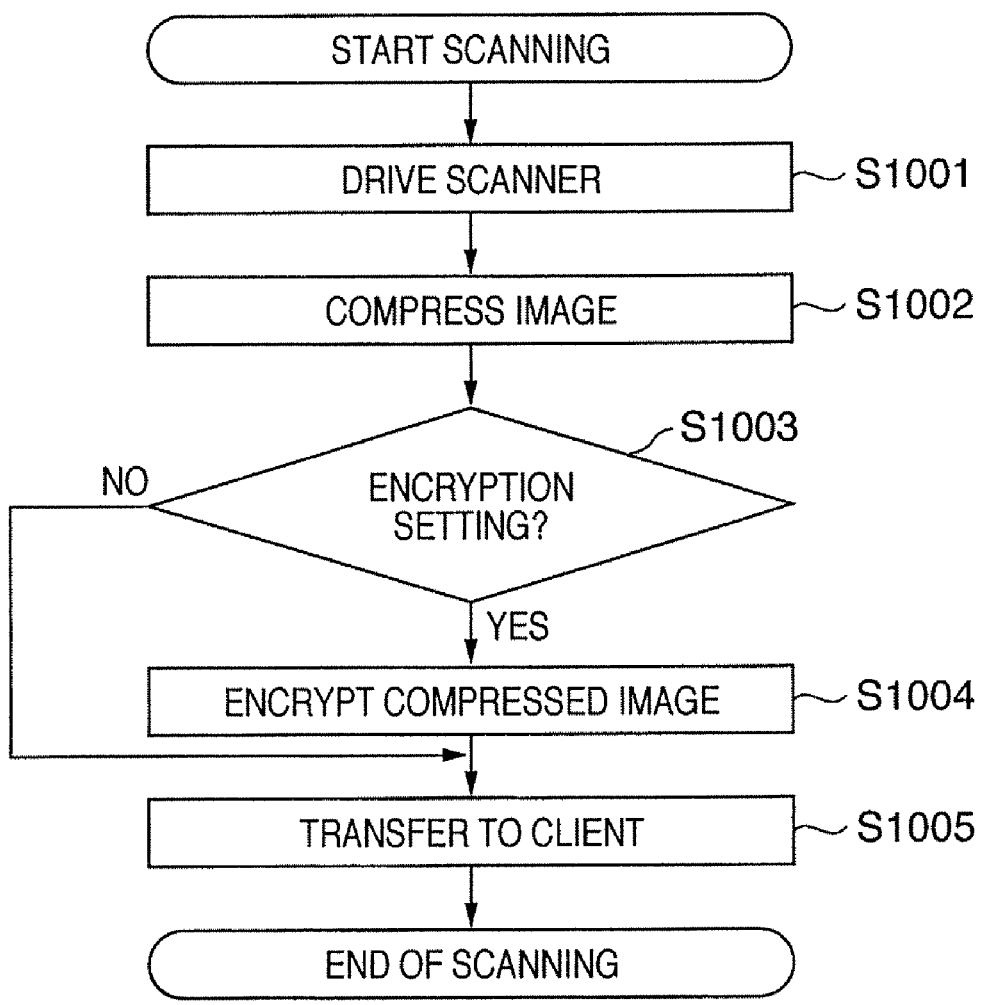
FIG. 10 is a flowchart illustrating a scan process according to Embodiment 3.

FIG. 10 is a flowchart illustrating a scan process according to Embodiment 3. First, in step S1001, the scanner driving unit 901 starts the scanner 804 so as to read out the paper set in the scanner 804. The readout resolution and the like used in this process are those contained in the instruction to scan from the PC 810. The read-out electronic data is stored in the memory 802 or the auxiliary storage device 803 as an uncompressed image 906 for each page. Upon completion of the storage, a notification is sent to the image compression unit 902.

Subsequently, in step S1002, the image compression unit 902 compresses the stored uncompressed image 906 according to a specified file format. The file format used here is that contained in the instruction to scan from the PC 810. The compressed image is then stored as a compressed image 907 in the memory 802 or the auxiliary storage device 803.

Then, in step S1003, the image compression unit 902 determines whether or not encryption is set. If the server public key 909 is set by the administrator, the image compression unit 902 determines that the encryption setting has been made and proceeds to step S1004. If it is determined that encryption setting has not been made, then the image compression unit 902 sends the communication unit 904 an instruction to send the compressed image 907 to the PC 810, and the process moves to step S1005.

In step S1004, the encryption unit 903 encrypts the compressed image 907 produced in step S1002. More specifically, the compressed image 907 is encrypted with the server public key 909, and is stored as a public key encrypted image 908 in the memory 802 or the auxiliary storage device 803.

The algorithm used for encryption may be any algorithm as long as decryption is performed only with a secret key that can be paired with the server public key 909.

Upon completion of the encryption described above, the encryption unit 903 sends the communication unit 904 an instruction to transmit the public key encrypted image 908 to the PC 810.

Subsequently, in S1005, the communication unit 904 transmits the specified image to the PC 810. Upon completion of the transmission, the uncompressed image 906, compressed image 907, and the public key encrypted image 908 stored in the memory 802 or the auxiliary storage device 803 are deleted.

The scan process of the image forming apparatus 800 of Embodiment 3 is performed in the manner described above.

Next, the processes performed by the PC 810 that has received the encrypted image and the archive server 820 will be described.

When the scanner driver of the PC 810 receives an encrypted image from the image forming apparatus 800, the scanner driver transmits the received encrypted image to the archive server 820. At the same time, the name of the user logged in to the PC 810, the IP address of the PC 810, and the ID for identifying the image forming apparatus 800 are also transmitted as archival information.

Upon receiving the archival information and the encrypted image from the PC 810, the archive server 820 decrypts the encrypted image with the secret key. Then, the archive server 820 registers the decrypted image and the archival information with its archival storage database together with the current time.

In order for the decrypted images to have the same size and the same format, the archive server 820 may convert image data prior to registering the data. Furthermore, in order to make the retrieval easier, an OCR process may be performed to extract character information, followed by registration.

Finally, the archive server 820 transmits the decrypted image to the PC 810. If a defect is detected in the archival information or if a failure occurs during the decryption of the image, this archive server error is communicated to the scanner driver of the PC 810.

When the scanner driver of the PC 810 receives the decrypted image from the archive server 820, the scanner driver transmits the image data to the application that sent the instruction to scan.

According to Embodiment 3, as long as the archive server 820 does not transmit the image produced in the image forming apparatus 800, the application of the PC 810 cannot obtain the decrypted image file. Accordingly, the image can be stored in a safe manner in the archive server from the image forming apparatus 800 directly connected to the PC 810.

Although Embodiment 3 describes the case in which the scanner driver of the PC 810 performs communication between the image forming apparatus 800 and the archive server 820, software in the PC 810 may directly perform the communication.

Also, the archival information included in the log for forming an image is produced by the scanner driver, but the archival information may be produced by the image forming apparatus 800.

Embodiment 4

Next, Embodiment 4 according to the present invention will be described in detail with reference to FIGS. 11 to 13. In Embodiment 3, it was necessary to transfer a decrypted image from the archive server 820 to the PC 810 after being archived in the archive server 820; however, in Embodiment 4, a configuration is described in which a decrypted image is not transmitted over a network.

A system according to Embodiment 4 has the same hardware configuration as that of Embodiment 3, so a description thereof is omitted here.

First, a characteristic process of Embodiment 4, which is executed by the CPU 801 of the image forming apparatus 800, will be described with reference to FIGS. 11 to 13.

Figure 11:
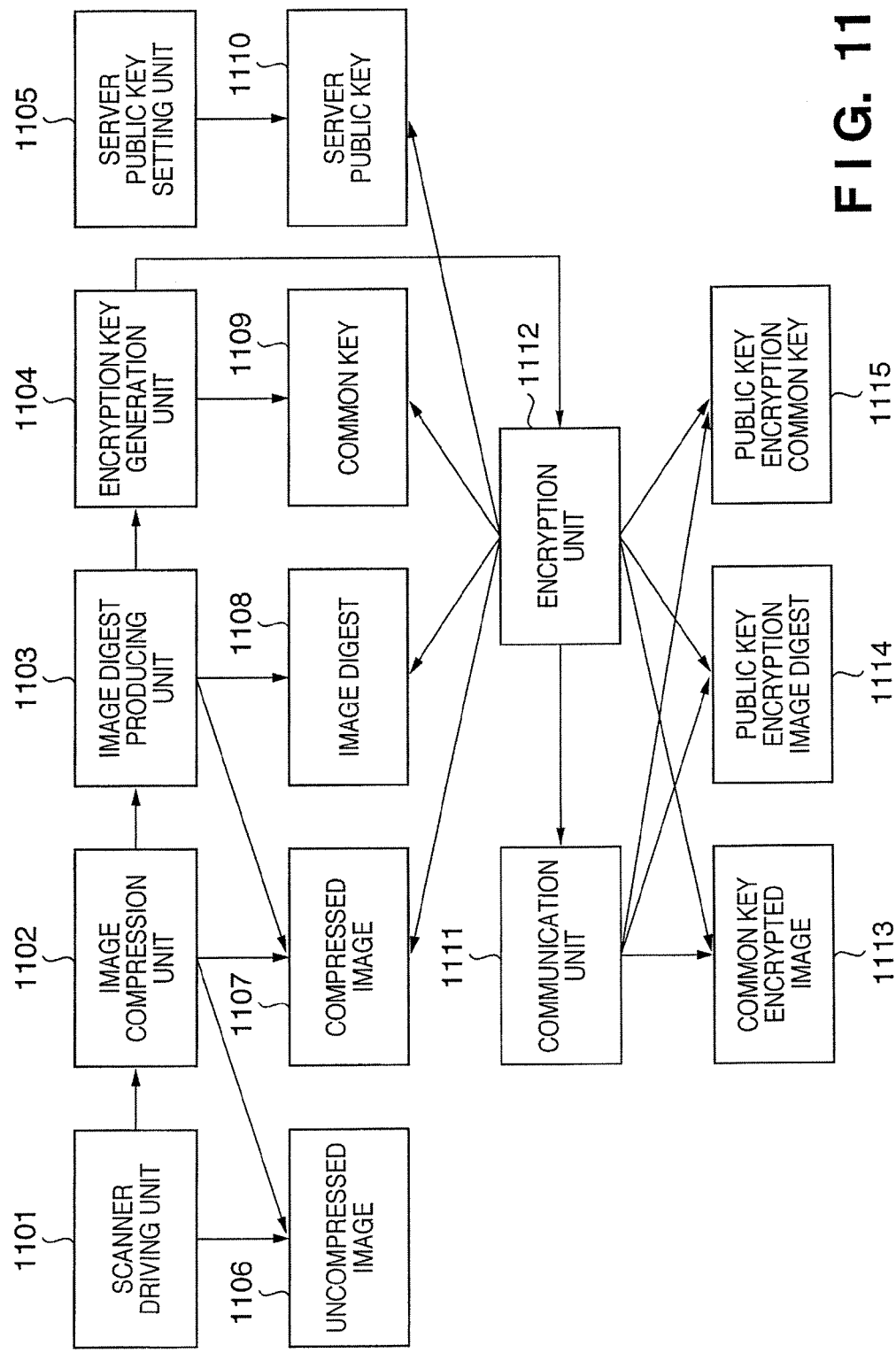
FIG. 11 is a diagram illustrating an example of a configuration of processing units of an image forming apparatus 800 according to Embodiment 4.

FIG. 11 is a diagram illustrating an example of a configuration of processing units of an image forming apparatus 800 according to Embodiment 4. In this diagram, a scanner driving unit 1101, an image compression unit 1102, a server public key setting unit 1105, an uncompressed image 1106, a compressed image 1107, a server public key 1110, and an encryption unit 1112 are the same as the processing units of Embodiment 3 shown in FIG. 9.

An image digest producing unit 1103 produces a hash value from the image file based on a one-way function, and stores the produced hash value as an image digest 1108. The one-way function for determining the hash value is to be used in the image forming apparatus 800 and in the archive server 820.

Subsequently, an encryption key generation unit 1104 generates a common key 1109 using a random function. The common key 1109 is generated to have different values every time the key is generated.

The process for setting the server public key in Embodiment 4 is the same as that of Embodiment 3, so a description thereof is omitted here.

Next, a scan process of Embodiment 4, in which the user performs readout with the scanner 804 of the image forming apparatus 800 through an application of the PC 810 in a manner similar to Embodiment 3, will be described.

Figure 12:
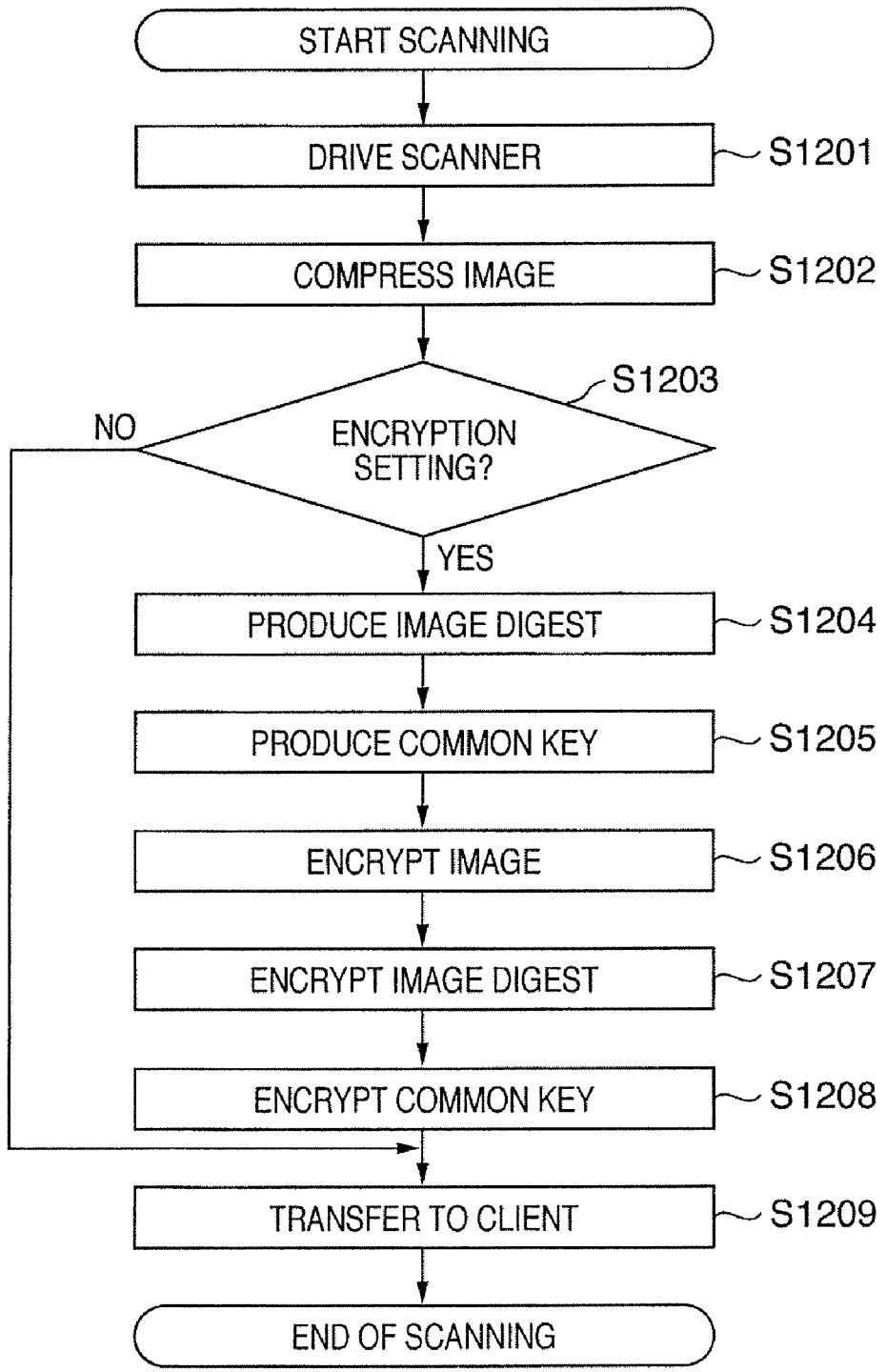
FIG. 12 is a flowchart illustrating a scan process according to Embodiment 4.

FIG. 12 is a flowchart illustrating the scan process of Embodiment 4. First, in step S1201, the scanner driving unit 1101 starts the scanner 804 to read out the paper set in the scanner 804. The readout resolution and the like used in this process are those contained in the instruction to scan from the PC 810. The read-out electronic data is stored in the memory 802 or the auxiliary storage device 803 as an uncompressed image 1106 for each page. Upon completion of the storage, a notification is sent to the image compression unit 1102.

Subsequently, in step S1202, the image compression unit 1102 compresses the stored uncompressed image 1106 according to a specified file format. The file format used here is that contained in the instruction to scan from the PC 810. The compressed image is then stored as a compressed image 1107 in the memory 802 or the auxiliary storage device 803.

Subsequently, in step S1203, the image compression unit 1102 determines whether or not encryption has been set. If the server public key 1110 has been set by the administrator, the image compression unit 1102 determines that encryption setting has been made, and the procedure moves to step S1204. If determination is made that the encryption setting has not been made, then the image compression unit 1102 sends the communication unit 1111 an instruction to send the compressed image 1107 to the PC 810, and proceeds to step S1209.

In step S1204, the image digest producing unit 1103 calculates a hash value from the compressed image 1107 produced in step S1202. The calculated hash value is stored as an image digest 1108 in the memory 802 or the auxiliary storage device 803.

Subsequently, in step S1205, the encryption key generation unit 1104 generates a common key 1109. Then, in step S1206, the encryption unit 1112 encrypts the compressed image 1107 with the common key 1109 to generate a common key encrypted image 1113. This encryption unit 1112 employs an encryption algorithm in which the common key encrypted image 1113 cannot be decrypted into the compressed image 1107 if the decryption is performed without the common key 1109.

Thereafter, in step S1207, the encryption unit 1112 compresses the image digest 1108 with the server public key 1110 to generate a public key encryption image digest 1114. The algorithm used for this encryption may be any algorithm as long as the decryption is allowed only with a secret key that can be paired with the server public key 1110.

Subsequently, in step S1208, the encryption unit 1112 encrypts the common key 1109 with the server public key 1110 to generate a public key encryption common key 1115. The algorithm used for this encryption is the same as that used in step S1207.

Upon completion of the above encryption, the encryption unit 1112 sends the communication unit 1111 an instruction to transmit the common key encrypted image 1113, the public key encryption image digest 1114, and the public key encryption common key 1115 to the PC 810.

Subsequently, in step S1209, the communication unit 1111 transmits the specified data to the PC 810. Upon completion of the transmission, the images stored in the memory 802 or the auxiliary storage device 803 are deleted. More specifically, the uncompressed image 1106, the compressed image 1107, the image digest 1108, the common key 1109, the common key encrypted image 1113, the public key encryption image digest 1114, and the public key encryption common key 1115 are deleted.

In the above-described manner, the scan process of the image forming apparatus 800 of Embodiment 4 is performed.

Next, the process performed by the PC 810 that has received the encrypted image and the archive server 820 will be described.

When the scanner driver of the PC 810 receives encrypted information from the image forming apparatus 800, the scanner driver transmits the received encrypted information to the archive server 820. At the same time, the name of the user who is logged into the PC 810, the IP address of the PC 810, and the ID for identifying the image forming apparatus 800 also are transmitted as archival information.

Figure 13:
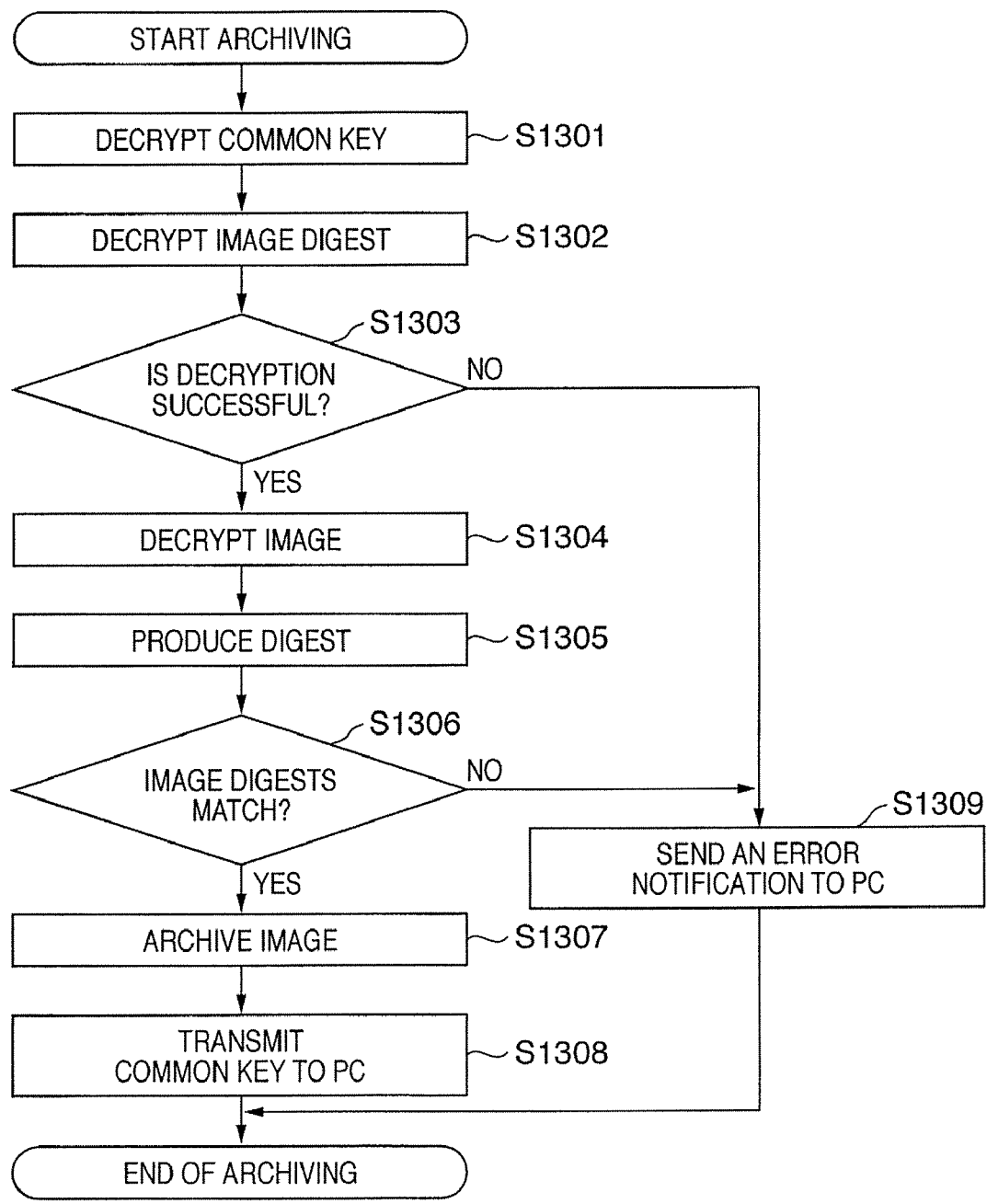
FIG. 13 is a flowchart illustrating an archiving process according to Embodiment 4.

Upon receiving the archival information and the encrypted information from the PC 810, the archive server 820 performs the process shown in FIG. 13. FIG. 13 is a flowchart illustrating an archival process of Embodiment 4.

First, in step S1301, of the received encryption information, the common key encrypted with the public key of the archive server 820 is decrypted with the secret key of the archive server 820. Subsequently, in step S1302, of the received encryption information, the image digest encrypted with the public key of the archive server 820 is decrypted with the secret key of the archive server 820.

Subsequently, in step S1303, determination is made whether or not the decryption performed in steps S1301 and S1302 has been successful. If the decryption is determined to have been successful, the processing proceeds to step S1304. If the decryption is determined to be unsuccessful, the processing proceeds to step S1309.

In step S1304, the encrypted image sent from the PC 810 is decrypted with the common key decrypted in step S1301. Subsequently, in step S1305, the hash value of the image decrypted in step S1304 is calculated. The one-way function for calculating the hash value is the same as that used in the image digest producing unit 1103 of the image forming apparatus 800.

Subsequently, in step S1306, comparison is made between the image digest decrypted in step S1302 and the image digest calculated in step S1305. As a result, if they match, the processing proceeds to step S1307. If they do not match, the processing proceeds to step S1309.

In step S1307, determination is made that the information sent from the PC 810 has been produced in the image forming apparatus 800 and is not altered, and the decrypted image and the archival information are registered with its archival storage database together with the current time. Similarly to Embodiment 3, information for making it easy to retrieve other images may be registered.

Subsequently, in step S1308, the common key decrypted in step S1301 is transmitted to the PC 810. In step S1309, a process after the occurrence of a failure in step S1303 or S1306 is performed. Such a failure is regarded as an unintentional alteration of information or a defect, so an error notification is sent to the PC 810.

In the manner described above, the archive server 820 archives images.

Meanwhile, upon receiving the decrypted encryption key from the archive server 820, the scanner driver of the PC 810 decrypts the encrypted image received from the image forming apparatus 800 using the encryption key, after which the image data is taken out.

Although the archival information included in the log for forming image is produced by the scanner driver, but the archival information may be produced by the image forming apparatus 800.

As described above, the images processed in the image forming apparatus can be stored in an insured manner in the archive server without transferring the decrypted images from the archive server to the PC after the images are archived in the archive server.

[Variation]

In Embodiments 3 and 4 described above, the information for archiving is transmitted from the PC to the archive server. However, a case may occur in which the connection between the PC and the archive server is not established due to a network failure or a breakdown of the archive server itself. In such a case, the scanner driver of the PC displays a screen display that asks the user to check the network, and holds the job. Thereafter, upon receiving a notification from the user indicating that the job is to be resumed, the scanner driver reconnects to the archive server.

Alternatively, if the connection with the archive server is interrupted after the transmission of images to the archive server, the scanner driver displays a notification indicating the interruption to the user, and holds the job. Thereafter, upon accepting an instruction from the user to retry, the scanner driver again attempts to establish a connection with the archive server.

In the case of the two error processes described above, the PC cannot obtain the decrypted image. Accordingly, an effect is obtained that the PC cannot handle images unless the archiving is performed normally into the archive server.

The images are processed in the image forming apparatus, but a similar process may be performed by the scanner driver of the PC.

The process for executing the image processing method is not limited to the image forming system shown in FIG. 1, and various processes may be implemented by, for example, a dedicated image forming apparatus or a generic computer. When executing on a generic computer, a computer-executable program that includes program code for causing the generic computer to execute each step of the image processing method is loaded into the generic computer.

Further, the program that allows the generic computer to execute image forming is read from a ROM incorporated in the generic computer, a storage medium that can be read out by the generic computer, or a server through a network.

The present invention may be employed in a system including a plurality of devices (e.g., a host computer, an interface device, a reader, a printer, etc.), or in an apparatus including a single device (e.g., a copier, a facsimile machine, etc.).

It is also possible to employ a configuration in which a recording medium in which program code of software that realizes the function(s) of the above-described embodiment(s) are recorded is provided to a system or apparatus, and the program code stored in the recording medium is read out and executed by the computer (CPU or MPU) of the system or apparatus. It goes without saying that such a configuration can also realize an object of the present invention.

In this case, the program code that is read out from the recording medium realizes the function(s) of the above-described embodiment(s), so the recording medium that stores the program code constitutes the present invention.

As the recording medium for providing the program code, for example, a flexible disk, a hard disk, an optical disk, a magneto-optical disk, a CD-ROM, a CD-R, a magnetic tape, a nonvolatile memory card, a ROM, or the like can be used.

It also goes without saying that, with the execution of the program code read out by the computer, not only the function(s) of the above-described embodiment(s) is realized, but the following case is also included; that is, the function(s) of the above-described embodiment(s) is realized by executing part or all of the actual process through an OS (operating system) or the like that runs on a computer based on instructions written in the program code.

It also goes without saying that a case is included in which the program code read out from the recording medium can be written in a memory provided in a function expansion board of a computer or a function expansion unit connected to a computer, after which, based on instructions in the program code, the CPU or the like provided in the function expansion board or function expansion unit executes part or all of the actual process, and the function(s) of the above embodiment(s) are realized by the process.

According to the present invention, even when communication between an image managing apparatus that stores image data of a submitted job and an image processing apparatus is not possible, the security of the image data can be improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-328845 filed Dec. 5, 2006, which is hereby incorporated by reference herein in its entirety.

What is claimed is:

1. A printing apparatus, comprising:

authentication means for performing a first authenticating of a user account by determining whether the user account and a password entered by a user correspond with a registered user account and a password associated to the registered user account, respectively;

scan means for scanning a document to obtain image data after the first authentication has been made;

compression means for compressing the obtained image data according to a specified file format contained in a received scan instruction;

encryption means for encrypting the compressed obtained image data;

transmission means for transmitting the encrypted compressed obtained image data and the authenticated user account to an archive server through a network;

decompression means for decompressing the compressed obtained image data;

printing means for printing, automatically without user intervention, the image data responsive to receipt of a notification indicative of completion of archiving of the image data and the authenticated user account after transmitting the obtained image data and the authenticated user account;

inquiry means for inquiring about whether a communication with the archive server is available, when the notification is not received;

wherein the transmission means is further constructed for retransmitting the encrypted compressed obtained image data and the authenticated user account to the archive server through the network when it is found that a communication with the archive server is available by the inquiry;

wherein, responsive to receipt of a notification indicative of completion of archiving of the image data and the authenticated user account after retransmitting the encrypted compressed obtained image data and the authenticated user account, the authentication means is further constructed for allowing a user to reenter a user account and a password before printing the image data, and for performing a second authenticating of the user account by determining whether the user account and the password reentered by the user correspond with a registered user account and a password associated to the registered user account, respectively; and determination means for determining whether the user account authenticated by the first authentication corresponds with the user account authenticated by the second authentication;

wherein the printing means is further constructed for printing the image data in a case where the user accounts are determined to correspond.

2. A method executed by a printing apparatus, comprising:

a first authenticating step of authenticating a user account by determining whether the user account and a password entered by a user correspond with a registered user account and a password associated to the registered user account, respectively;

scanning a document to obtain image data after the first authentication has been made;

compressing the obtained image data according to a specified file format contained in a received scan instruction;

encrypting the compressed obtained image data;

transmitting the encrypted compressed obtained image data and the authenticated user account to an archive server through a network;

decompressing the compressed obtained image data;

printing, automatically without user intervention, the image data responsive to receipt of a notification indicative of completion of archiving of the image data and the authenticated user account after transmitting the obtained image data and the authenticated user account;

inquiring about whether a communication with the archive server is available, when the notification is not received;

retransmitting the encrypted compressed obtained image data and the authenticated user account to the archive server through the network when it is found that a communication with the archive server is available by the inquiry;

responsive to receipt of a notification indicative of completion of archiving of the image data and the authenticated user account after retransmitting the encrypted compressed obtained image data and the authenticated user account, allowing a user to reenter a user account and a password before printing the image data, and a second authenticating step of authenticating the user account by determining whether the user account and the password reentered by the user correspond with a registered user account and a password associated to the registered user account, respectively;

determining whether the user account authenticated by the first authenticating step corresponds with the user account authenticated by the second authenticating step; and printing the image data in a case where the user accounts are determined to correspond.

3. A non-transitory computer readable memory medium retrievably storing therein an executable program for causing a computer to execute a method, said method comprising:

a first authenticating step of authenticating a user account by determining whether the user account and a password entered by a user correspond with a registered user account and a password associated to the registered user account, respectively;

scanning a document to obtain image data after the first authentication has been made;

compressing the obtained image data according to a specified file format contained in a received scan instruction;

encrypting the compressed obtained image data;

transmitting the encrypted compressed obtained image data and the authenticated user account to an archive server through a network;

decompressing the compressed obtained image data;

printing, automatically without user intervention, the image data responsive to receipt of a notification indicative of completion of archiving of the image data and the authenticated user account after transmitting the obtained image data and the authenticated user account;

inquiring about whether a communication with the archive server is available, when the notification is not received;

retransmitting the encrypted compressed obtained image data and the authenticated user account to the archive server through the network when it is found that a communication with the archive server is available by the inquiry;

responsive to receipt of a notification indicative of completion of archiving of the image data and the authenticated user account after retransmitting the encrypted compressed obtained image data and the authenticated user account, allowing a user to reenter a user account and a password before printing the image data, and a second authenticating step of authenticating the user account by determining whether the user account and the password reentered by the user correspond with a registered user account and a password associated to the registered user account, respectively;

determining whether the user account authenticated by the first authenticating step corresponds with the user account authenticated by the second authenticating step; and printing the image data in a case where the user accounts are determined to correspond.

* * * * *